(No Model.)
I. T. HARDY.
Lubricator.
No. 233,347. Patented Oct. 19, 1880.
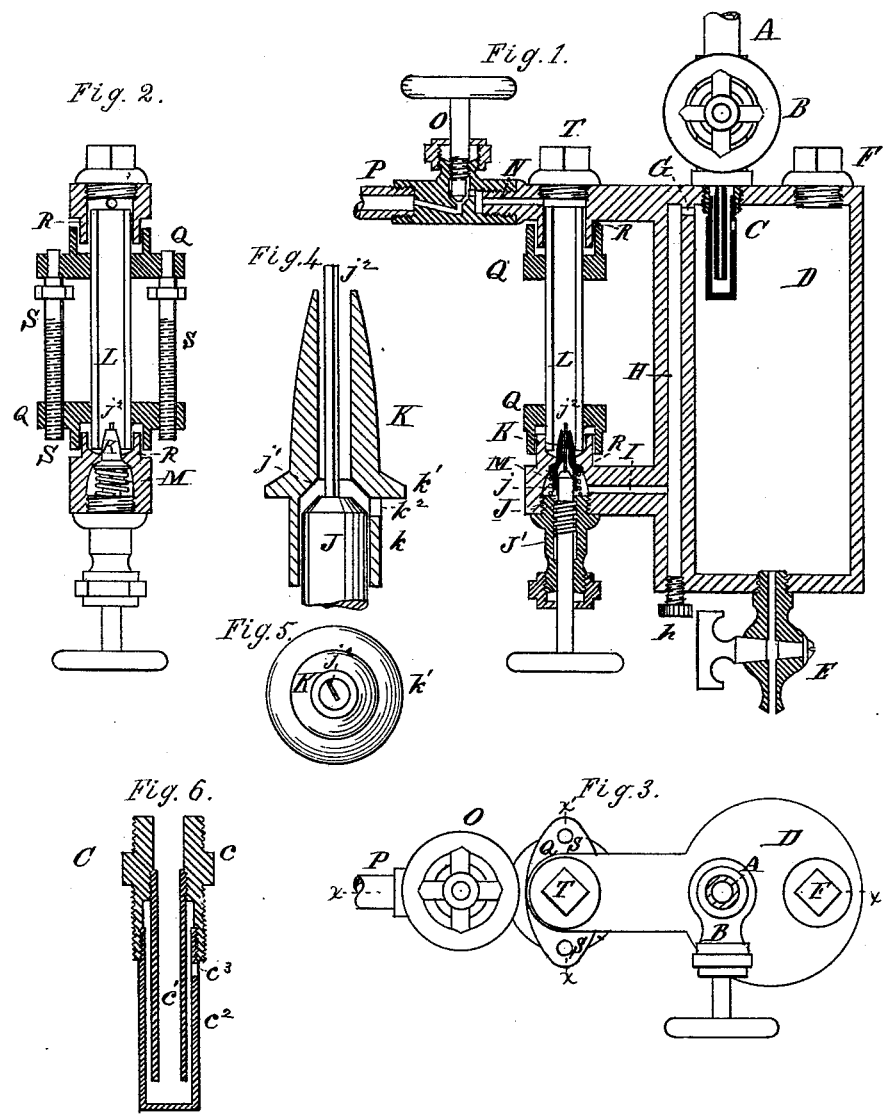
Witnesses:
G. D. Knight
H. E. Knight
Inventor:
Isham T. Hardy
By Knight Bros.
Attys.

UNITED STATES PATENT OFFICE.

ISHAM T. HARDY, OF ST. LOUIS, MISSOURI.

LUBRICATOR.

SPECIFICATION forming part of Letters Patent No. 233,347, dated October 19, 1880.

Application filed August 19, 1880. (No model.)

*To all whom it may concern:*

Be it known that I, ISHAM T. HARDY, of the city of St. Louis, in the State of Missouri, have invented a certain new and useful Improvement in Lubricators for Steam Cylinders, Chests, Pipes, &c, of which the following is a full, clear, and exact description, reference being had to the accompanying drawings, in which—

Figure 1 is mainly a longitudinal section at $x\ x$, Fig. 3, showing some parts in side view. Fig. 2 is mainly a transverse section at $x'\ x'$, Fig. 3, showing some parts in elevation. Fig. 3 is a top view. Fig. 4 is an enlarged section of the nozzle or nipple through which the oil enters the transparent tube, showing, in elevation, the adjustable valve with the reaming-knife upon it to keep the nipple open. Fig. 5 is a top view of the nipple. Fig. 6 is an enlarged section of the trap through which the water enters the oil-vessel, and which prevents the escape of oil into the water-pipe.

My invention is intended for the lubricating of the interior of steam-cylinders, steam-chests, steam-pipes used for heating purposes, &c.; and it belongs to the class of lubricators having an oil-chamber that is gradually filled with water from a steam-condensing pipe or other device, said water causing the oil to flow from the upper part of the vessel and to enter the steam-pipe for lubrication of any cylinder, chest, or valve, &c., with which it may be connected.

My improvement consists in the general construction and arrangement of parts, and more particularly in the construction of the valve regulating the flow of oil into the glass tube, in the manner of securing the glass indicator-tube in place, and to the device for reaming or cleaning the oil-nipple.

A is a pipe forming part of or extending from a condenser in communication with a steam pipe or vessel. A simple pipe of sufficient length above the lubricator forms an efficient condenser. The pipe A discharges the water of condensation through a valve or cock, B, into the water-trap C, set in the upper end of the oil-vessel D. The trap allows the water to enter the oil-vessel and prevents the escape of oil from the vessel D into the pipe A.

The construction of the trap is as follows: $c$ is a piece of pipe, open at both ends, and fixed in the top of the oil-vessel D. $c'$ is a piece of pipe of smaller diameter, also open at both ends, and forming an extension of pipe $c$; and $c^2$ is a pipe or cup closed at the lower end, and whose upper end is closely attached to the lower end of pipe $c$. Between the pipe $c'$ and the cup $c^2$ there is a water-space, as shown, for the upward flow of water from the lower end of pipe $c'$ to a discharge-orifice, $c^3$, in the side of pipe $c^2$, near or at its upper end.

It will be understood that the part of the pipe or cup $c^2$ below the orifice $c^3$ is continuously filled with water, so that no oil can escape through the trap.

E is a cock at the lower end of the oil-vessel, by which the water may be discharged when the vessel is nearly filled with water. F is a screw-plug stopping the orifice through which the oil-vessel is filled with oil. As the water of condensation enters the oil-vessel through the trap C it (the water) descends to the bottom of the vessel and causes the oil to flow out through the orifice G, at the upper part of the vessel D, into the descending duct H. (Shown as cast in one piece with the vessel D.) The duct H is stopped at bottom by a screw-plug, $h$.

I is an oil-passage leading from the duct H to the valve-chamber $j$ of the valve J. The valve J may be of any suitable construction.

The seat $j'$ of the valve J is in a nipple or nozzle, K, closing, except for the oil-orifice through its center, the lower end of the transparent water-duct L. The nozzle or nipple K is held up against its seat by a spring, M, surrounding its lower cylindrical portion, $k$, said spring bearing against the collar $k'$. The valve J works in the portion $k$. Thus a guide is formed for the valve J and a support or brace for the spring.

$k^2$ is an orifice through the part $k$, for the entrance of oil above the valve J, so that the oil passes through the port of valves J and the central passage of the nipple into the glass duct L, where it is caused to ascend by the superior gravity of the water. The oil escapes through the passage N to the valve or cock O and to the pipe P leading to the steam-cylinder, steam-chest, or to a system of heating-pipes, or to other equivalent destination where interior lubrication is needed.

$j^2$ is a knife-blade, which is shown as being eccentrically attached to the valve J, and extending upward through the nipple K to keep the oil-orifice in the nipple clean by the simple turning of the valve-stem, the nipple remaining at rest.

Heretofore glass tubes have been secured in indicators and lubricators of this class by screw-glands, and this necessitated the making of screws on the sockets, in which the ends of the tube were secured.

In my improvement the screw-threads upon the sockets and glands are dispensed with, and this enables me to cast the sockets R in one piece with the oil-vessel, as they do not require screw-threading. The glands Q Q are held in position upon the sockets R R by side screw-rods, S S, turning freely in one gland and screwing in the other gland. Thus by turning the screws S the glands may be tightened upon the sockets R, and the usual soft packing compressed upon the glass tube L.

It is claimed that this manner of securing the glass in position causes much less strain upon the glass than when the gland is made to turn thereon, as heretofore.

T is a screw-plug, closing the orifice through which the glass tube L is passed on insertion or removal.

The operation of the apparatus is as follows: The water of condensation escapes from the pipe A, through the valve B and the trap C, into the oil-vessel D. The oil is forced upward by the entering water, and passes through the passages G H I, orifice $k^2$, nipple K, tube L, passage N, port of valve O, and pipe P to the interior of the cylinder, &c., to be lubricated. The entrance of condensed water is limited by valve B, and the flow of oil by valves J and O. Valves B and O are closed when removing water from the oil-vessel and filling it with oil, which is done when the stoppage of oil-flow indicates its emptiness.

When it is desired to clear the bottom of indicator L from sediment the whole valve device J K may be removed by unscrewing the cap J' of the valve.

I claim as my invention—

1. The combination, with the indicator, of the spring-seated nipple or nozzle K and adjustable valve J, the said nipple nearly closing the indicator, and being adapted to form a seat for the valve, substantially as set forth.

2. The combination of the sockets R R, glands Q Q, and screw-rods S S, directly connected to the said glands, turning therein, and adapted to adjust said glands to said sockets, as and for the purpose set forth.

3. The combination of the valve J, provided with knife-reamer $j^2$ and the nipple K, the said valve being adapted to rotate the said knife within the said nipple for the purpose of scraping without closing the latter, as set forth.

In testimony of which invention I have hereunto set my hand this 12th day of August, 1880.

ISHAM T. HARDY.

Witnesses:
  SAML. KNIGHT,
  GEO. D. KNIGHT.